April 28, 1970  H. E. BROWN  3,509,318
DOMESTIC ELECTRIC APPLIANCE
Original Filed April 5, 1967  2 Sheets-Sheet 1

INVENTOR
HAROLD E. BROWN

BY Oberlin, Maky, Donnelly & Renner
ATTORNEYS

April 28, 1970   H. E. BROWN   3,509,318
DOMESTIC ELECTRIC APPLIANCE
Original Filed April 5, 1967   2 Sheets-Sheet 2
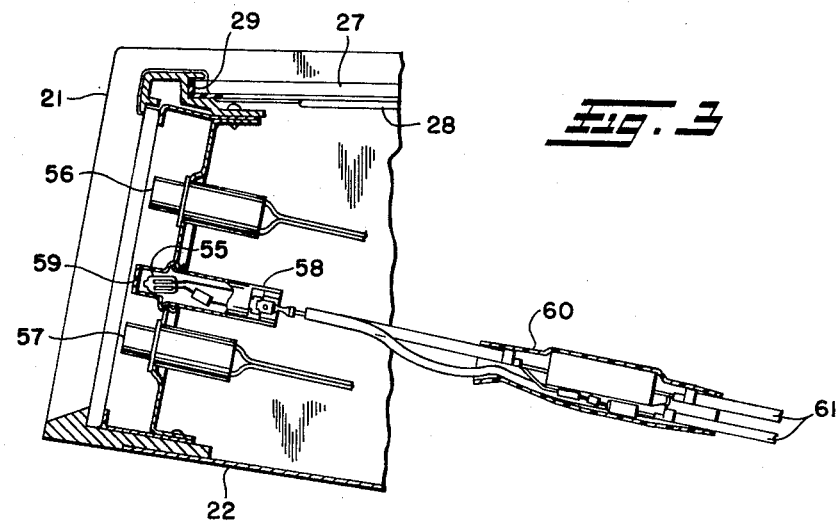
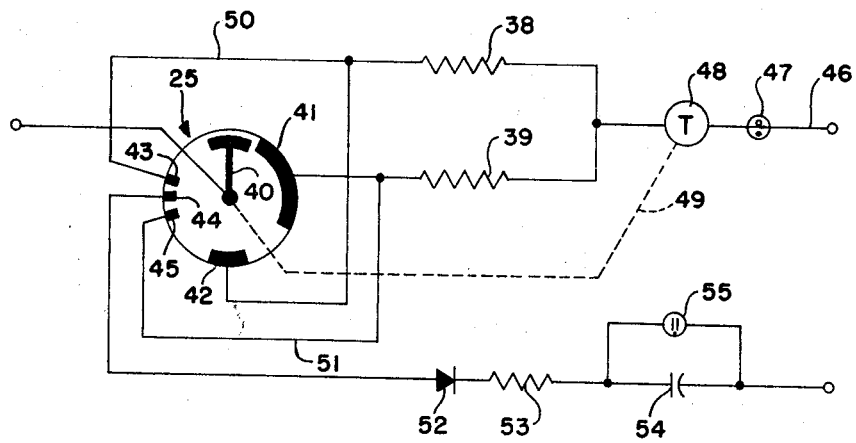
INVENTOR
HAROLD E. BROWN
BY
Oberlin, Maky, Donnelly & Renner
ATTORNEYS United States Patent Office 3,509,318
Patented Apr. 28, 1970

3,509,318
DOMESTIC ELECTRIC APPLIANCE
Harold E. Brown, Mansfield, Ohio, assignor to The Tappan Company, Mansfield, Ohio, a corporation of Ohio
Continuation of application Ser. No. 628,634, Apr. 5, 1967. This application Mar. 26, 1969, Ser. No. 810,854
Int. Cl. F27d *11/02;* H05b *3/68*
U.S. Cl. 219—396                                    12 Claims

ABSTRACT OF THE DISCLOSURE

A domestic electric appliance for kitchen food preparation having basic range structure, viz. an oven and cook top array of surface heaters, and, in combination, a high-speed food electric heater intended principally to provide substantially accelerated defrosting of frozen foods and heating thereof to serving temperature. The combination further includes a heated warming shelf, with the high-speed heater and warming shelf in a backward assembly on the basic range unit.

---

This is a continuation of application Ser. No. 628,634 filed Apr. 5, 1967, now abandoned.

This invention relates to a domestic appliance of enhanced utility in the preparation of food in a home kitchen.

While cooking range structure has remained basically unchanged in providing for heating or cooking of food either within an oven or in utensils placed on surface burners or elements, there has been a great proliferation of separately heated utensils, for the most part electrical in nature, and these seek to capitalize on being able to accomplish a limited function in a more efficient or perhaps only in a more convenient manner. The range oven must for example be of substantial size sufficient to handle the maximum load anticipated for full family service, and there have always been a number of operations carried out in such ordinary range structure, for example, in some baking, in which preheating of the oven to the needed temperature involves almost as much or even more time than the actual cooking period. The wide and continuously expanding use of pre-cooked and frozen foods, which need only to be defrosted and then heated to the desired serving temperature, has greatly emphasized the inefficiency of the ordinary oven in such sense and has led to the development of small auxiliary appliances designed particularly for this type of food preparation. An auxiliary electric heating device must of course be supported with access to a receptacle for energization, usually by a cord, and this may not always prove convenient in a given kitchen, especially since the range ordinarily occupies the place considered best suited for food preparation in the plan of a kitchen.

It is thus a primary object of the present invention to provide in structural combination with a basic range unit a highspeed electric food heater for comparatively light food loads, such as frozen food packages, wherein the accelerated heating is conveniently accomplished by improved and more efficient heat coupling with the food product. By means of such improved coupling, the desired heat can in effect be applied as fast as possible without burning, and it is a further object to provide such a heater in which the product is subjected simultaneously to heat from a plurality of sources.

While the frozen dinner product had perhaps its greatest initial appeal to a person dining alone or with one other, the variety and quality of these products have so improved that it is not uncommon now to prepare larger servings, for example, for four persons or more. The small separate appliance which might for example be capable only of handling two servings at one time loses its advantage over the range in this situation, but even with such multiple servings, the latter is still relatively inefficient although the delay is of course outweighed by the capacity to serve all at the same time.

It is therefore another object of this invention to provide a new domestic appliance in which a basic range unit has combined therewith not only a high-speed food heater as noted but additionally a warming section to maintain the temperature of products heated in either or both of the range unit or the high-speed heater.

It is a further object to provide such an appliance in which the range unit, high-speed heater and warming section are not only combined but organized spatially in such relation as to facilitate use thereof individually or concurrently. The warming section in particular complements the high-speed heater so that the latter can be of optimum size for incorporation in the appliance to handle the lightest expected load, for example, one or two frozen food packages, by maintaining two which have been heated to the serving temperature at that temperature while two more are processed in the high-speed heater for serving of all together.

An additional object of the invention is to provide such a domestic appliance in which the high-speed heater and warming section are incorporated in a backguard assembly for the basic range unit, with the warming section moreover in the form of a shelf at convenient elevation above the top of the range unit.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 3 is a fragmented further transverse section of such assembly indicated by the line 3—3 in FIG. 1; and FIG. 4 is a simplified wiring diagram of a portion of the electrical wiring of the appliance.

Figure 1:
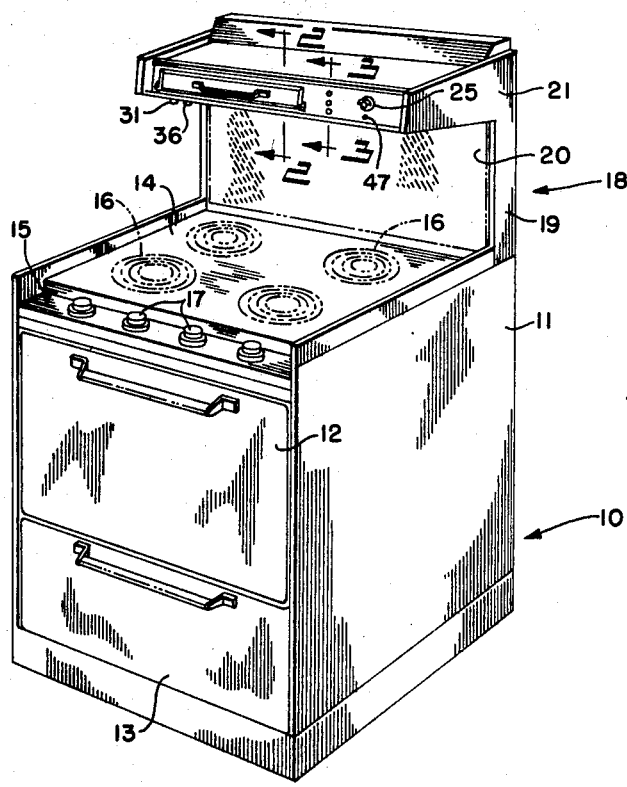
FIG. 1 is a perspective view of a domestic appliance in accordance with the present invention.

Referring now to the drawings in detail, the illustrated embodiment of the invention comprises a free-standing range unit designated generally by reference numeral 10 which is basically of known construction. This unit thus comprises a cabinet 11 within which there is the usual oven cavity closed at the front by a bottom-hinged door 12 and a lower compartment which may, for example, in an electric version of the range, receive a storage drawer 13.

The upper portion of the cabinet 11 supports a cooking top assembly 14 and a front control section 15. The dashed outlines 16 are intended to represent conventional surface heaters the details of which are unimportant, with the knobs 17 spaced along the front control section providing individual control for such surface units in any known suitable manner. For a purpose which will later appear, it is significant to note that this range unit is preferably approximately 30″ wide, 25″ deep and 36″ high, this last dimension being the usual height of a kitchen counter.

Figure 2:
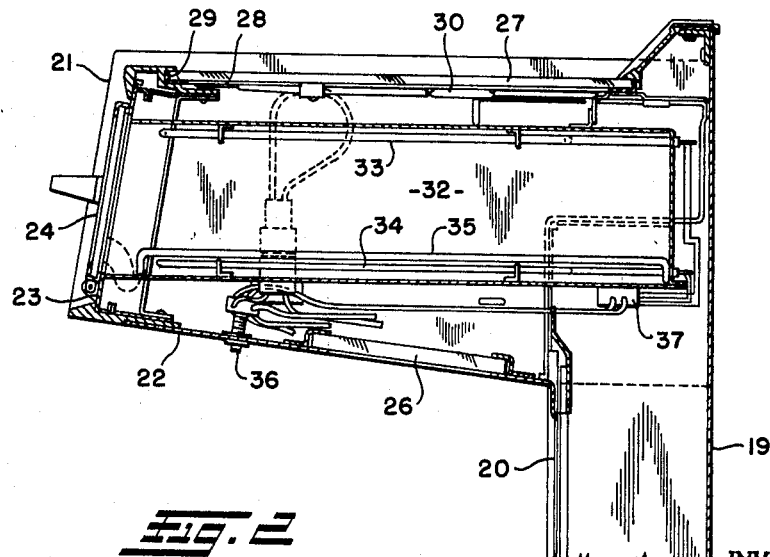
FIG. 2 is a transverse cross-section of the upper portion of the backguard assembly of such appliance as indicated by the line 2—2 in FIG. 1.

The range unit 10 supports a combination backguard and shelf assembly generally designated by reference numeral 18 which is of inverted L-shape and extends fully across the top rear of the cabinet 11 in upwardly projecting relation. Such assembly comprises a riser section 19 which is of course of the same width as the cabinet and is of considerable height proportionate to its depth. This riser section is hollow, as shown in FIG. 2, and a decorative panel 20 such as textured glass is shown as constituting the front of such section to enhance its appearance. The upper part or section 21 of the backguard assembly 18 is horizontal and projects forwardly over the top of the range unit 10. Such upper section is also hollow and actually a housing, again as evident in FIG. 2, with a bottom wall 22 which slopes downwardly to the rear at a small inclination and a front wall 23 also at a small rearward inclination upwardly from the lower front edge. Within this housing there is a defroster or rapid heating unit having a bottom hinged front door 24 and to be explained further in detail below, together with certain controls, including a combined selector and variable temperature control operated by the knob 25 at the right front of the upper section 21. The bottom wall 22 has a rectangular opening extending substantially fully across the width of the section and a glass panel 26 is mounted at this opening for lighting of the cook top 14 by a fluorescent tube, not shown, also contained within the section 21.

The top of section 21 is comprised of framing enclosing and supporting an electrically heated panel which constitutes a warmer or warming shelf. It is preferred that this warmer, which will be seen to be substantially the complete width and depth of the upper section, comprises a translucent glass panel 27 to the underside of which the electric resistance element 28 is applied in any suitable known manner, for example by screening and applying an overcoat of insulation, since this will provide illumination of the shelf by the same light within the section which provides the earlier noted illumination of the range top through the bottom glass panel 26. The shelf panel 27 is shown supported in the top frame of the section by a gasket 29 about the periphery, and it will be understood that other heated panels, for example, of porcelain enameled steel, can be substituted with equal utility as far as the warming shelf function is concerned. A suitable thermostat 30 is applied to the bottom surface of the panel 27 in the circuit of the resistance element 28, which also includes an on-off switch shown as operated by the pushbutton 31 at the left front corner of the backguard section 21, and the purpose of this thermostat is to limit the temperature of the shelf to a predetermined value, preferably about 200° F.

With further reference to FIG. 2, the defroster or rapid heater unit comprises an inner casing 32 of shallow boxlike form and open at the front behind the noted hinged door 24. Top and bottom electric heating elements 33 and 34 are supported respectively horizontally closely adjacent the top and bottom walls of the casing 32, and an article-supporting rack 35 extends in spaced relation over the bottom element 34. These heating elements may be of common sheathed and convoluted type or in the form of panels or combinations of the two, and it will be understood that they extend substantially fully over the area of the defroster casing or housing.

The defroster unit is turned on and off by the further pushbutton switch 36 also shown located at the left front corner of the backguard assembly, and the temperature of the unit is limited by a bottom-engaging thermostat 37 which is, for example, operative to open the circuit when the interior temperature is about 450° F. It desired, the unit can be equipped with a control of conventional type to provide selectively two levels of heating.

All of the noted controls and the wiring for the same and the defroster and warmer are of course enclosed and can readily be brought from the upper section 21 of the background assembly downwardly through the riser section 19 and into the rear of the cabinet 11 where the appropriate power connections will be made. As noted, one of these controls is the range oven regulators 25 and this device is shown schematically in FIG. 4 in association with oven top and bottom electric resistance heating elements 38 and 39, respectively. The specific form of this regulator is not significant and may be of any suitable known type, with only the desired operating mode of concern here and most readily illustrated by the showing the regulator as comprising a rotary wiper contact 40 having a connection to one side of the energy source and being movable by turning of the knob 25 selectively into engagement with a first arcuate contact strip 41 of considerable length, a second contact 42, and a third contact assembly in which it bridges three separate terminals 43, 44 and 45, as will be more fully described. A circuit 46 extends from the other side of the energy source through an incandescent lamp 47, serving as an oven "on" light, an adjustable thermostat 48 and from the latter commonly to the top and bottom oven elements 38, 39. The dashed line 49 between the wiper contact 40 of the regulator and the thermostat 48 will be understood to represent that the adjustment of the former is effective to vary proportionally the setting of the thermostat as is common in thermostatic oven control. The other end of the bottom element 39, which is the bake element, is connected to the first contact strip 41, so that movement of the wiper 40 in engagement with this strip energizes this element and maintains the oven temperature in such heating at the value determined by the extent to which the thermostat is adjusted by the rotary movement.

The other end of the top or broil element 38 is connected to the second fixed contact 42, and it will be evident from the diagram that the movement of the wiper arm 40 into engagement therewith will cause such top element to be energized for broiling, while the lower element is not energized. In order to provide for rapid preheating of the range oven, there is a further connection 50 from the top element 38 to the contact 43 of the regulator and a connection 51 from the bottom element 39 to the contact 45 of the same group. The third contact 44 of this group is a terminal of a flashing light circuit comprising a diode rectifier 52, a resistor 53, a capacitor 54, and a neon bulb 55 in parallel with the capacitor. Since this circuit as such is known and widely used, it will be sufficient to note generally that, when the circuit is energized, rectified voltage will be applied to the capacitor 54 for accumulation of a charge sufficient to cause breakdown or illumination of the neon bulb 55, with the interval for charging to the breakdown voltage appreciable enough to provide continuous flashing of the light as long as the circuit remains energized.

Accordingly, when the regulator wiper 40 is moved to the pre-heat position, it engages simultaneously the three contacts 43–45, so that both the top and bottom oven elements 38, 39 are energized for maximum heat input to the oven, and the existence of this condition is signaled by the continuous flashing light 55.

The oven "on" light 47, which will of course be illuminated whenever one of the oven heating elements is energized or both, is shown as located on the front wall 23 of the upper backguard section just below the regulator knob 25. To the left of the regulator on this wall there are three lamps arranged in a vertical row, as shown more clearly in FIG. 3, with the upper one 56 of these connected in the circuit for the warming shelf 27, 28 for steady "on" whenever the shelf is heated, and the lowermost 57 in the circuit with the defroster unit elements 33, 34 similarly to become and remain illuminated whenever this unit is energized. The intermediate lamp is the preheat flashing light 55 and is shown more fully as comprising a tubular housing 58 carrying the neon bulb 55 at the forward end and a translucent plastic lens 59, preferably red, enclosing such bulb and projecting forwardly of the wall 23 through an opening provided therefor. The signal ligdts 56 and 57 will also preferably comprise comparable housing and red plastic lens. The components and connections which make up the capacitor charging circuit are enclosed within a harness 60, which may for example be of vinyl tubing, and cables 61 extend from the harness for energization of this circuit in the manner previously described.

The housewife or other user of this appliance accordingly has available a plurality of surface heaters at counter height, an oven of regular size in which fast pre-heating can be carried out with special signaling, a smaller capity high-speed heater for defrosting frozen food packages and the like, and a warming shelf which can complement any one or more of the first three operations. The special flashing light signaling of the continuance of the pre-heat condition of the oven affords protection against the user neglecting to turn the regulator from the pre-heat position to the baking condition after the desired pre-heat temperature has been reached, which has proved to be a not uncommon experience.

The high speed heater is of course of such design as to provide a very close coupling of products, such as the frozen food packages mentioned, therein and exposed simultaneously from both the top and bottom elements 33, 34. Within specific dimensions, there elements can be easily selected as to wattage to provide the maximum input without burning of the product, and this design can provide defrosting and heating in many cases in approximately half the time that would be required to perform the same operation in the main oven. This unit may, for example, be dimensioned to provide a useful cavity approximately 2" high, 10" deep and 14" wide, which will be seen readily to accommodate two of the typical complete frozen dinner packages. As noted at the outset, two such packages can be heated in roughly half the normal time and kept warm by placement on the warming shelf while two more are defrosted and heated to the serving temperature.

It will also be appreciated that the proportioning of the combination backguard and shelf assembly 18 relative to the basic range unit 10 is significant from a standpoint of convenient utilization and, in the exemplary appliance in which the range unit is approximately 30" wide and 25" deep, the riser section 19 will preferably be approximately 2" deep and 13" high, this last dimension being the clearance between the surface of the cook top 14 and the bottom wall 22 of the upper backguard section 21. This upper section, moreover, will have a depth of about 12" and a maximum height at the rear of about 5", so that the shelf 27, 28 is about 18" above the cook top surface. With this dimensioning, the warming shelf will ordinarily be about 8½" deep and 28½" wide.

The noted height of the backguard riser section 19 insures that the shelf unit will not hinder or interfere with the use of utensils on the rear surface heaters over which the shelf extends. The shelf extent is furthermore close to half of the total depth of the range unit. It will be appreciated that some further utility might be incorporated in the backguard assembly by adding one or more convenience outlets, for example and the construction lends itself to the possible ready inclusion of a power vent system for the cook top if desired. The specific controls which have been described are of course more or less basic and added control features can also be included as preferred.

What is claimed is:

1. A domestic appliance comprising a range unit including a cooking top at waist height having front and rear surface heating units, a combination backguard and shelf assembly of general inverted L-shape, said assembly including a hollow riser section projecting upwardly at the top rear of said cooking top over the width thereof, the upward projection of said section being on the order of about half of the depth of said cooking top, with the riser section depth being comparatively small, the backguard assembly further including an upper shelf section which projects forwardly from the riser section horizontally over generally the entire rear portion of the cooking top, said shelf section being vertically relatively shallow and including as the upper surface thereof a panel extending over substantially the full width of the assembly and hence the cooking top, and electric heating means within said shelf section in heat transfer relation to said panel for heating the same to a temperature which will keep heated articles placed thereon warm.

2. A domestic appliance as set forth in claim 1, wherein said heating means comprises an element applied to the underside of said panel.

3. A domestic appliance as set forth in claim 1, wherein said panel is made of light transmitting material, and the shelf section contains a light source therebeneath to illuminate the panel area.

4. A domestic appliance as set forth in claim 1, wherein the shelf section contains a separate food compartment having an access door at the front.

5. A domestic appliance as set forth in claim 4, wherein the heating means comprises an element within said separate food compartment.

6. A domestic appliance as set forth in claim 1, wherein said cooking top is supported on an oven-containing cabinet, and the overall height of the combination backguard and shelf assembly is approximately half the height of said cabinet and cooking top.

7. A domestic appliance comprising a range unit including a cooking top at waist height having front and rear surface heating units, a combination backguard and shelf assembly of general inverted L-shape, said assembly including a hollow riser section projecting upwardly at the top rear of said cooking top, with the riser section depth being small relative to its height and width, the backguard assembly further including an upper shelf section which projects forwardly from the riser section horizontally over generally the entire rear portion of the cooking top, the height of said shelf section being small relative to the width and depth of the same, the overall height of said assembly being such that the top surface of the upper section serves as a conveniently accessible shelf above the cooking top, enclosure means forming a separate food compartment within the shelf section, the enclosure means having an access opening and being provided with a door for closing said opening, and electric heating means for heating food placed within such shelf section compartment.

8. A domestic appliance as set forth in claim 7, wherein said electric heating means comprises an element located in the upper portion of said food compartment.

9. A domestic appliance as set forth in claim 7, wherein the food compartment door is located at the front of the shelf section.

10. A domestic appliance comprising a free-standing range unit including an oven-containing cabinet and a front oven door, a cooking top of substantially the same area as the cabinet supported thereon at waist height, the cooking top having plurality surface heating devices, a combination backguard and shelf assembly of general inverted L-shape, said assembly including a hollow riser section projecting upwardly at the top rear of the cooking top over the width thereof, with the riser section depth being small relative to its width and height, the backguard assembly further including an upper shelf section which projects forwardly from the riser section horizontally over generally the entire rear portion of the cooking top, the height of said shelf section being small relative to the width and depth of the same, the overall height of the background and shelf assembly being approximately half the height of the cabinet and cooking top, the upper surface of the shelf section being substantially unobstructed for supporting articles thereon at a conveniently accessible spacing above the cooking top, a separate food compartment within the shelf section having a front door, and electric heating means in the shelf section, said heating means being so disposed as to impart heat to food placed in the separate compartment.

11. A domestic appliance as set forth in claim 10, wherein the shelf section food compartment has a width less than that of the section, and the latter further has a range control at the front.

12. A domestic appliance as set forth in claim 11, wherein the shelf section further contains a light source for illuminating the cooking top surface therebeneath.

References Cited

UNITED STATES PATENTS

| | | | |
|---|---|---|---|
| 2,864,932 | 12/1958 | Forrer | 219—405 X |
| 2,875,013 | 2/1959 | Fitzgerald. | |
| 3,089,479 | 5/1963 | Perl | 126—21 |
| 3,131,688 | 5/1964 | Lipstein | 126—21 X |
| 3,157,176 | 11/1964 | Pearce et al. | 126—21 X |
| 3,281,575 | 10/1966 | Ferguson | 219—404 |
| 3,413,443 | 11/1968 | Britt | 219—393 |

VOLODYMYR Y. MAYEWSKY, Primary Examiner

U.S. Cl. X.R.

219—479, 445; 99—339